J. O'CONNOR.
SOFT COLLAR HOLDER.
APPLICATION FILED APR. 2, 1921.

1,381,733.

Patented June 14, 1921.

WITNESSES
E. A. Wilson
J. L. McAuliffe

INVENTOR
JOHN O'CONNOR
BY
ATTORNEYS

UNITED STATES PATENT OFFICE.

JOHN O'CONNOR, OF NEW YORK, N. Y.

SOFT-COLLAR HOLDER.

1,381,733.  Specification of Letters Patent.  Patented June 14, 1921.

Application filed April 2, 1921. Serial No. 457,906.

*To all whom it may concern:*

Be it known that I, JOHN O'CONNOR, a citizen of the United States, and a resident of the city of New York, borough of Manhattan, in the county of New York and State of New York, have invented a new and Improved Soft-Collar Holder, of which the following is a description.

My present invention is in part a specific form of the invention forming the subject matter of United States Patent No. 1,369,703, granted to me February 22, 1921, and in part comprehends a distinctive feature disclosed in said patent as well as special embodiments of said distinctive feature, the present invention furthermore including a novel means for adjusting the relation of the upper and lower sections of a two-part collar holder.

Reference is to be had to the accompanying drawings forming a part of this specification, it being understood that the drawings are merely illustrative of practical examples of the invention.

Figure 1:
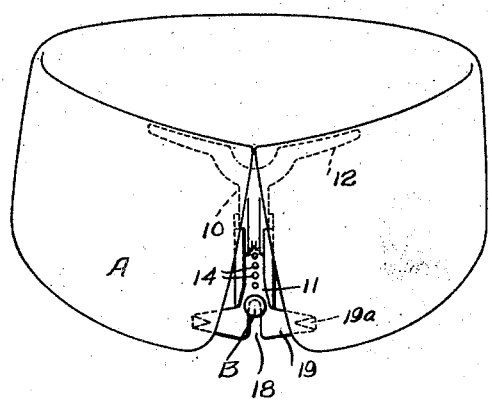
Figure 1 is a front elevation of a soft-collar holder embodying my invention in one form and showing the same in use, a collar being shown in perspective.
Figure 2:
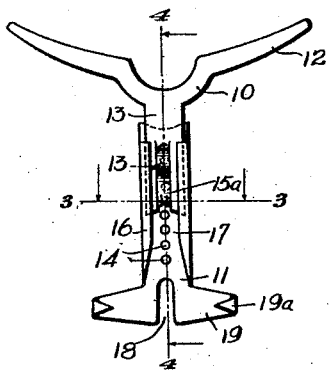
Fig. 2 is an enlarged front elevation of said holder.
Figure 3:
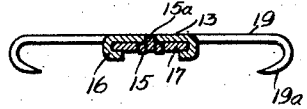
Fig. 3 is a horizontal section on the line 3—3, Fig. 2.
Figure 4:
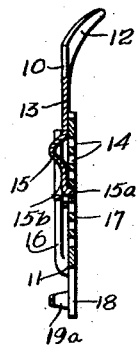
Fig. 4 is a vertical section on the line 4—4, Fig. 2.

Referring at first more particularly to Figs. 1 to 4 my improved soft-collar holder as illustrated in said figures, comprises an upper section and a separate lower section 11. Said upper section has a suitable formation for supporting engagement with a collar A at the top and within the collar, there being shown upwardly inclined wings 12 thereon at opposite sides. The upper section 10 includes a vertical shank 13 on which is an integral resilient tongue 15 free at its lower end and struck up in practice from the material of said shank. Said tongue at its free end is formed with a rearwardly deflected pawl or dog 15ª adapted to engage in any one of a vertical series of holes 14 in the shank 17 of the lower section 11. The tongue 15 at opposite sides of the pawl 15ª is deflected laterally outward as at 15ᵇ for a convenient finger-hold in flexing the tongue 15 to engage or disengage the pawl 15ª with a hole 14. On the shank 17 at the sides are flanges 16 affording guided sliding engagement to the shank 13.

In the lower end of the combined shank 11, 13, that is to say, in the shank section 11, I form a vertical slot 18 as a means for engaging a collar button A. By the described construction the total effective height of the collar holder may be varied to suit a particular collar by causing the pawl 15ª to engage one or other of a vertical series of holes 14. On the lower end of the combined shank, that is to say, on the lower section 11 of the form shown in Figs. 1 to 4, said shank is formed with integral lateral arms 19 extending in opposite directions at the sides in the general plane of the shank and said arms are returned inwardly at the front and tapered to a point to penetrate the material of the flaps of the collar A at each side of the collar button. The adjustment of the height of the holder will in no way alter the relation of the collar-engaging slot 18 and the penetrating returned ends 19ª so that the flaps are properly held regardless of the adjustment.

Figure 5:
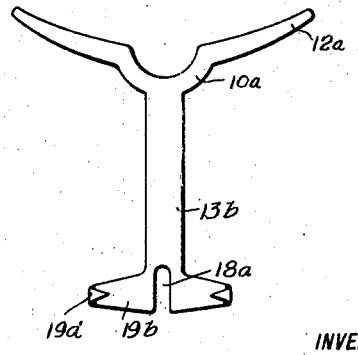
Fig. 5 is a view similar to Fig. 2 but illustrating a different embodiment of the members for engaging the collar flaps.

In Fig. 5 the arms 19ᵇ and their returned ends 19ᵈ corresponding in all respects with the arms 19 and ends 19ª are formed integral with a unitary shank 13ᵇ provided on the holder 10ª having at its upper end the lateral supporting arms 12ª corresponding with the arms 12.

I would state in conclusion that while the illustrated examples constitute practical embodiments of my invention, I do not limit myself strictly to the mechanical details herein illustrated, since manifestly the same can be considerably varied without departure from the spirit of the invention as defined in the appended claims.

Having thus described my invention, I claim:

1. A holder for soft collars including an upper section adapted to have supporting engagement with the collar within the latter, a lower section having means at its lower end to engage a collar button, means to adjustably connect said upper and lower connections to vary the total height of the holder, and lateral arms extending in opposite directions on said lower section, said arms having their ends returned laterally inward at the front and formed to penetrate the flaps of the collar.

2. A soft-collar holder comprising a vertical shank, means on the shank at the upper end adapted to have supporting engagement with the collar within the latter at the top, said shank having means at its lower end to engage a collar button, and lateral side arms extending in opposite directions on the shank at the sides of the collar-engaging means, said arms having their ends returned laterally inward at the front and formed to penetrate the flaps of a collar.

3. A holder for soft collars, including an upper section adapted to have supporting engagement with the collar within the latter, the lower section having means at its lower end to engage a collar button, as well as means to engage the flaps of the collar, a resilient tongue on one section, and co-engaging fastening means on said tongue and in vertical series on the other section to hold the sections in a given adjustment.

4. A soft-collar holder comprising an upper section adapted at its upper end to have supporting engagement with the collar within the latter, a resilient tongue on said upper section, a pawl on said tongue, and a lower section affording guided engagement with the upper section and having a vertical series of holes in which the pawl of said tongue is adapted to engage, said lower section having means to engage a collar button, and means at the sides of the collar-engaging means adapted to engage flaps of the collar.

JOHN O'CONNOR.